(12) United States Patent
Masuda

(10) Patent No.: US 10,100,891 B2
(45) Date of Patent: Oct. 16, 2018

(54) ELECTRIC BRAKE DEVICE

(71) Applicant: NTN Corporation, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 29 days.

(21) Appl. No.: 15/274,614

(22) Filed: Sep. 23, 2016

(65) Prior Publication Data

US 2017/0009830 A1 Jan. 12, 2017

Related U.S. Application Data

(63) Continuation of application No. PCT/JP2015/058220, filed on Mar. 19, 2015.

(30) Foreign Application Priority Data

Mar. 27, 2014 (JP) ................................ 2014-065267

(51) Int. Cl.
*F16D 65/18* (2006.01)
*B60T 13/74* (2006.01)
(Continued)

(52) U.S. Cl.
CPC ............ *F16D 65/18* (2013.01); *B60T 13/741* (2013.01); *F16D 55/226* (2013.01); *H02P 15/00* (2013.01);
(Continued)

(58) Field of Classification Search
CPC .... F16D 65/18; F16D 55/226; F16D 2125/50; F16D 2066/006; F16D 2066/0003;
(Continued)

(56) References Cited

U.S. PATENT DOCUMENTS 5,107,967 A * 4/1992 Fujita ..................... B60T 1/065
188/156
6,204,625 B1 3/2001 Seno
(Continued)

FOREIGN PATENT DOCUMENTS

CN 1246754 A 3/2000
CN 102619910 A 8/2012
(Continued)

OTHER PUBLICATIONS

Machine translation in English for JP 2003-202042A; Inventor: Yamaguchi; 14 pages; Retrieve Date: Nov. 14, 2017.*
(Continued)

*Primary Examiner* — Thomas J Williams
*Assistant Examiner* — Mariano Sy

(57) ABSTRACT

Provided is an electric brake device that can achieve improved control accuracy without involving a cost increase. The electric brake device includes an electric motor, a brake rotor, a friction pad, a transmission mechanism, a braking force command section, a braking force estimation section, a motor rotation angle detector, and a controller. The motor rotation angle detector, which is used in a partial region of a braking force from a minimum braking force to a maximum braking force, has a higher resolution than a motor rotation angle that causes a braking force fluctuation equivalent to a minimum braking force resolution of the braking force estimation section. The controller includes a resolution interpolation section configured to interpolate, by using a motor rotation angle detected by the motor rotation angle detector, a minimum resolution of the braking force obtained by the braking force estimation section.

6 Claims, 4 Drawing Sheets

(51) Int. Cl.
  *F16D 55/226* (2006.01)
  *H02P 15/00* (2006.01)
  *F16D 66/00* (2006.01)
  *F16D 121/24* (2012.01)
  *F16D 125/50* (2012.01)

(52) U.S. Cl.
  CPC .. *F16D 2066/003* (2013.01); *F16D 2066/005* (2013.01); *F16D 2066/006* (2013.01); *F16D 2121/24* (2013.01); *F16D 2125/50* (2013.01)

(58) Field of Classification Search
  CPC ........... F16D 2066/005; F16D 2121/24; B60T 13/741; H02P 15/00
  See application file for complete search history.

(56) References Cited

U.S. PATENT DOCUMENTS

| | | | |
|---|---|---|---|
| 6,959,791 B2* | 11/2005 | Usui | F16D 65/18 |
| | | | 188/158 |
| 7,215,090 B2* | 5/2007 | Kuramochi | H02P 3/04 |
| | | | 188/158 |
| 7,810,616 B2 | 10/2010 | Nakazeki | |
| 8,002,090 B2* | 8/2011 | Yasukawa | B60T 13/741 |
| | | | 188/156 |
| 8,833,526 B2 | 9/2014 | Goto et al. | |
| 2002/0023806 A1* | 2/2002 | Ohtani | B60T 13/741 |
| | | | 188/72.1 |
| 2003/0125863 A1* | 7/2003 | Tamasho | B60T 13/741 |
| | | | 701/70 |
| 2007/0035178 A1* | 2/2007 | Suzuki | B60T 8/885 |
| | | | 303/122.05 |
| 2008/0110704 A1 | 5/2008 | Nakazeki | |
| 2008/0288147 A1* | 11/2008 | Cesario | B60T 8/174 |
| | | | 701/70 |
| 2009/0045767 A1* | 2/2009 | Bergeron | B27B 27/10 |
| | | | 318/590 |
| 2012/0193177 A1 | 8/2012 | Goto et al. | |
| 2014/0290402 A1* | 10/2014 | Yamasaki | H02K 29/06 |
| | | | 74/89.23 |
| 2017/0002881 A1* | 1/2017 | Masuda | F16D 65/18 |

FOREIGN PATENT DOCUMENTS

| | | | |
|---|---|---|---|
| JP | 6-327190 | | 11/1994 |
| JP | 11-280799 | | 10/1999 |
| JP | 2000-78892 | | 3/2000 |
| JP | 2000-213575 | | 8/2000 |
| JP | 2000213575 A | * | 8/2000 |
| JP | 2003-202042 | | 7/2003 |
| JP | 2003202042 A | * | 7/2003 |
| JP | 2003-287063 | | 10/2003 |
| JP | 2006-105224 | | 4/2006 |
| JP | 2006105224 A | * | 4/2006 |
| JP | 2006-194356 | | 7/2006 |

OTHER PUBLICATIONS

Machine translation in English for JP 2000-213575A; Inventor: Niwa; 14 pages; Retrieve Date: Nov. 14, 2017.*
Machine translation in English for JP 2006-105224A; Inventor: Matsumoto; 9 pages; Retrieve Date: Nov. 14, 2017.*
International Search Report dated Jun. 23, 2015 in corresponding International Application No. PCT/JP2015/058220.
International Preliminary Report on Patentability dated Oct. 6, 2016 in corresponding International Patent Application No. PCT/JP2015/058220.
Extended European Search Report dated Nov. 14, 2017 in corresponding European Patent Application No. 15769044.7.
Japanese Notification of Reason(s) for Rejection dated Nov. 28, 2017 in corresponding Japanese Patent Application No. 2014-065267.
Office Action dated Apr. 3, 2018, in corresponding Chinese Patent Application No. 201580016254.5, 7 pgs.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2015/058220, filed Mar. 19, 2015, which is based on and claims Convention priority to Japanese patent application No. 2014-065267, filed Mar. 27, 2014, the entire disclosure of which is herein incorporated by reference as a part of this application.

BACKGROUND OF THE INVENTION

Field of the Invention

The present invention relates to an electric brake device that can achieve improved control accuracy without involving a cost increase.

Description of Related Art

As conventional electric brake devices, the following devices have been proposed.

(1) An electric brake device that converts a rotary motion of a motor into a linear motion via a linear motion mechanism by depressing a brake pedal, thereby bringing a brake pad into press contact with a brake disk to apply a braking force (Patent Document 1).

(2) An electrically operated linear actuator using a planetary roller screw mechanism (Patent Document 2).

(3) A braking force estimation section using a strain sensor (Patent Document 3).

RELATED DOCUMENT

Patent Document

[Patent Document 1] JP Laid-open Patent Publication No. H06-327190

[Patent Document 2] JP Laid-open Patent Publication No. 2006-194356

[Patent Document 3] JP Laid-open Patent Publication No. 2003-287063

In the electric brake device (1) that converts the rotary motion of the motor into the linear motion or the electric brake device (2) that uses the planetary roller screw mechanism, it is necessary to provide a braking force estimation section for controlling the braking force accurately and to form a control system including a feedback element. In that case, it is common to use a computing unit such as a microcomputer to form a digital control system that repeats calculation every predetermined sampling time.

At this time, the shorter the sampling time is set, the higher the speed and the accuracy of the control can be attained, but, on the other hand, the higher the required resolution of the braking force estimation section becomes. If the resolution is insufficient, the responsiveness of the control system may be impaired, resulting in a decrease in the control accuracy. For example, in ABS control, there is a demand for controlling the braking force accurately and at high speed in order to prevent wheels from slipping. Insufficient response speed or control accuracy may cause problems, for example, that the wheels exceed the slip limit to adversely affect steering or, conversely, that the braking force is reduced to increase the braking distance.

With the electric brake device (3) that detects deformation or strain caused by a reaction force during pressing of the friction pad and estimates the braking force, it is necessary to greatly deform the constituent elements in order to use a precision sensor. Accordingly, the problem of reduction in rigidity or durability may arise. It may also be necessary to provide a highly effective shield or insulation as an anti-noise measure, which may lead to an increased cost and an increased mounting space.

SUMMARY OF THE INVENTION

An object of the present invention is to provide an electric brake device that can achieve improved control accuracy without involving a cost increase.

Hereinafter, in order to facilitate understanding, the present invention will be described with reference to the reference numerals used in embodiments for convenience sake.

An electric brake device according to a first embodiment of the present invention includes: an electric motor 2; a brake rotor 5; a friction pad 6 configured to come into contact with the brake rotor 5 to generate a braking force; a transmission mechanism 4 configured to convert a rotary motion of the electric motor 2 into a motion of the friction pad 6; a braking force command section 26a configured to generate a command value of a target braking force by using an operation amount of a brake operation portion 29; a braking force estimation section 30 configured to obtain an estimated value of a braking force that presses the friction pad 6 against the brake rotor 5; a motor rotation angle detector 28 configured to detect a rotation angle of the electric motor 2; and a controller 7 configured to control the electric motor 2 according to the command value and the estimated value of the braking force, wherein the motor rotation angle detector 28 has a higher resolution than a motor rotation angle that causes a braking force fluctuation equivalent to a minimum braking force resolution of the braking force estimation section 30, and wherein the controller 7 includes a resolution interpolation section 37 configured to interpolate, by using the motor rotation angle detected by the motor rotation angle detector 28, the minimum resolution of the braking force obtained by the braking force estimation section 30.

The minimum braking force is a minimum braking force that can be detected by the braking force estimation section 30. A maximum braking force is a braking force at which the command value generated by the braking force command section 26a has a maximum value. The "resolution" indicates a minimum interval between detectable braking forces or motor rotation angles, and is represented in a bit number or the like in digital data. For example, the resolution is a value obtained by dividing a maximum value M of the braking force (or the motor rotation angle), which is a continuous quantity, by a number obtained by adding 1 to an L-bit (L is a natural number) digital maximum value ($2^L-1$), i.e., a value per bit ($=M/2^L$), relative to the maximum value M of the braking force (or the motor rotation angle).

With this configuration, the motor rotation angle detector 28 has a higher resolution than the motor rotation angle that causes a braking force fluctuation equivalent to the minimum braking force resolution of the braking force estimation section 30. As the motor rotation angle detector 28, a detector that is inexpensive and have high resolution are widely put into practical use, so that the motor rotation angle detector 28 can be readily mounted in the electric brake device. Since an existing detector originally provided in the electric motor 2 can be applied as the motor rotation angle detector 28, it is not necessary to secure a mounting space for the motor rotation angle detector, and to newly add a dedicated sensor to the electric brake device, thus making it possible to achieve a cost reduction.

While the braking force transitions from zero to the maximum value, the detected motor rotation angle transitions, a plurality of times, over a full scale from an angle "0" to the maximum angle in the motor rotation angle detector 28, for example. How much the motor rotation angle detected by the motor rotation angle detector 28 transitions relative to the minimum resolution of the braking force can be estimated based on information that is provided in advance, such as caliper rigidity and an equivalent lead. Based on a result of this estimation, the resolution interpolation section 37 of the controller 7 interpolates, by using the motor rotation angle detected by the motor rotation angle detector 28, the minimum resolution of the braking force obtained by the braking force estimation section 30. Then, for example, even when the detection resolution of the braking force is lower than the required resolution of the target braking force, a control can be performed by interpolating and calculating an intermediate value with the motor rotation angle. In this manner, it is possible to achieve improved control accuracy without involving a cost increase.

The braking force estimation section 30 may use a value detected by a load sensor 13 configured to detect an axial load of the transmission mechanism 4. In this case, the controller 7 causes a linear motion portion 14 of the transmission mechanism 4 to advance the friction pad 6 from a position separate from the brake rotor 5 to an outboard side to bring the friction pad 6 into contact with the brake rotor 5, and obtains the reaction force as a minimum value, i.e., a braking force that can be detected by the load sensor 13. With an increase in the operation amount of depressing the brake operation portion 29, the braking force detected by the load sensor 13 gradually increases. By using the load sensor 13, it is possible to more accurately detect the braking force than by obtaining an estimated value of the braking force from a sensor output of the brake operation portion 29 and a motor current.

The resolution interpolation section 37 may:
determine a relationship between a braking force estimation result at a point of time when the braking force obtained by the braking force estimation section 30 changes by a prescribed value or higher and the motor rotation angle detected by the motor rotation angle detector 28; and
interpolate and calculate intermediate values between the braking force estimation result and each of next braking force estimation results obtained by adding prescribed positive addition value and negative addition value to the braking force estimation result, respectively, based on the motor rotation angle detected by the motor rotation angle detector 28.

The prescribed value is arbitrarily determined as required, for example, from results of an experiment, simulation, or the like.

The resolution interpolation section 37 may increase the prescribed value with an increase in a difference between the braking force estimation result and the command value of the braking force that is generated by the braking force command section 26a. The resolution interpolation section 37 may increase the prescribed value with an increase in a rate of change of a difference between the braking force estimation result and the command value of the braking force that is generated by the braking force command section 26a.

Increasing the prescribed value reduces the resolution, but improves the anti-noise characteristics. When the difference between the braking force command value and the braking force estimation result or the rate of change of the difference is large, the effect of resolution interpolation is relatively small. Therefore, the resolution interpolation section 37 executes a so-called thinning process for increasing the prescribed value according to the difference or the rate of change of the difference. This can reduce the computational load of the controller 7.

The controller 7 may include a calculation section 37 configured to associate a predetermined motor rotation angle and a predetermined braking force with each other based on the motor rotation angle detected by the motor rotation angle detector 28, and based on the braking force obtained by the braking force estimation section 30. For example, the calculation section 37 obtains an absolute angle of the motor rotation angle by determining which of a plurality of rotations the motor rotation angle corresponds to, based on the braking force.

While the braking force transitions from zero to the maximum value, the motor rotation angle detected by the motor rotation angle detector 28 transitions, a plurality of times, over a full scale from the angle "0" to the maximum angle. In addition, a piston position (i.e., the motor rotation angle) at which the friction pad and the brake rotor start coming into contact changes due to the wear of the friction pad or the like. Therefore, the absolute angle of the motor rotation angle for accurately exerting a desired braking force cannot be known only by the motor rotation angle detector 28. According to this configuration, the calculation section 37 of the controller 7 can obtain an absolute angle of the motor rotation angle for exerting a desired braking force, from a relationship between the motor rotation angle detected by the motor rotation angle detector 28 and the braking force obtained by the braking force estimation section 30. Accordingly, it is possible to achieve improved control accuracy without involving a cost increase.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
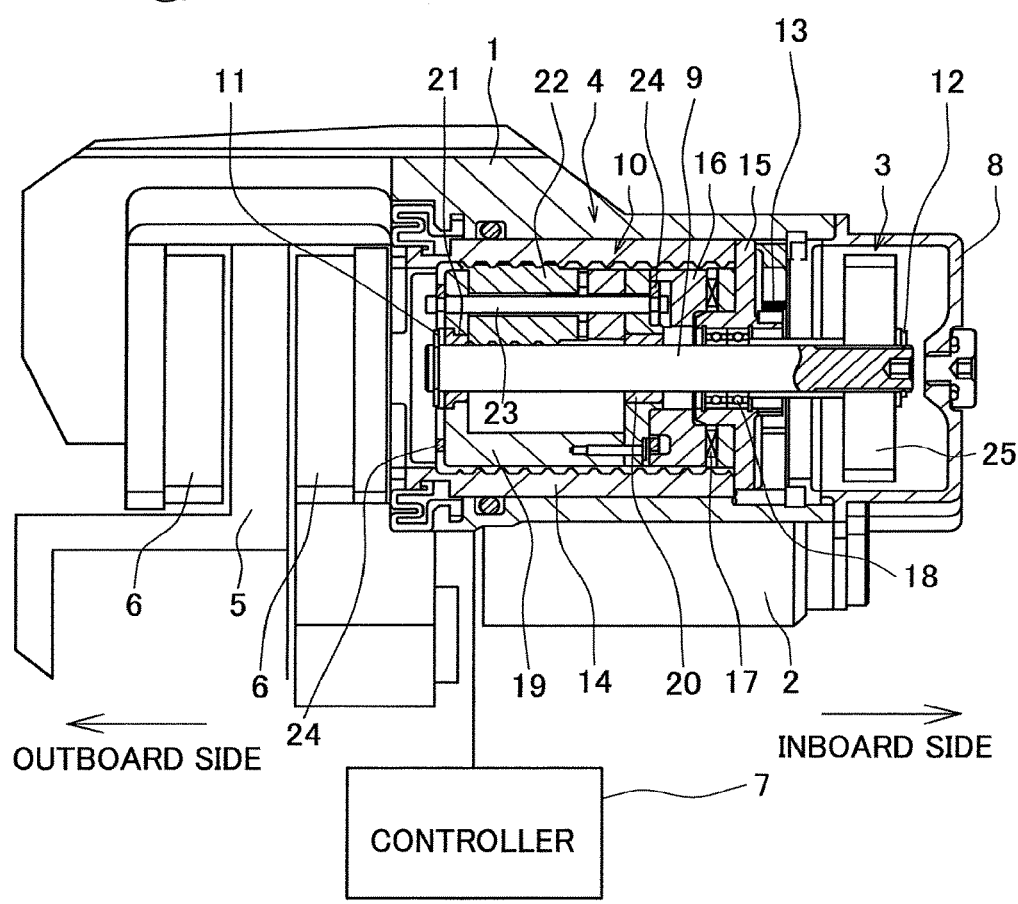
FIG. 1 is a cross-sectional view of an essential portion of an electric brake device according to an embodiment of the present invention.

An electric brake device according to an embodiment of the present invention will be described with reference to FIGS. 1 to 4. As shown in FIG. 1, the electric brake device includes a housing 1, an electric motor 2, a speed reduction mechanism 3 that reduces the speed of rotation of the electric motor 2, a linear motion mechanism 4 serving as a transmission mechanism, a brake rotor 5, a friction pad 6, a locking mechanism (not shown), and a controller 7 that controls the electric motor 2. The electric motor 2 is supported by the housing 1 of a caliper. The linear motion mechanism 4 is incorporated into the housing 1 so as to apply a braking force to the brake rotor 5 (to a disc rotor in this example) by an output from the electric motor 2. The housing 1 has an opening end covered by a cover 8.

The linear motion mechanism 4 will now be described. The linear motion mechanism 4 is a mechanism that converts a rotary motion outputted from the speed reduction mechanism 3 into a linear motion and brings the friction pad 6 into contact with the brake rotor 5 or separates the friction pad 6 from the brake rotor 5. The linear motion mechanism 4 includes a rotation shaft 9 that is rotationally driven by the electric motor 2, a conversion mechanism section 10 that converts the rotary motion of the rotation shaft 9 into the linear motion, restraining sections 11 and 12, and a load sensor 13, which is also called a load cell or a force sensor. The conversion mechanism section 10 includes a linear motion portion 14, a bearing member 15, an annular thrust plate 16, a thrust bearing 17, a plurality of rolling bearings 18, a carrier 19, slide bearings 20 and 21, and a plurality of planetary rollers 22.

The linear motion portion 14 of a cylindrical shape is supported on the inner circumferential surface of the housing 1 such that the linear motion portion 14 is prevented from rotating and is movable in the axial direction. On the inner circumferential surface of the linear motion portion 14, a helical projection is helically formed so as to project by a predetermined distance in the radially inward direction. The plurality of planetary rollers 22 mesh with the helical projection.

The bearing member 15 is provided at one end side, in the axial direction, of the linear motion portion 14 in the housing 1. The bearing member 15 includes a flange portion that extends radially outward, and a boss portion. The plurality of rolling bearings 18 are fitted within the boss portion, and the rotation shaft 9 is fitted onto the inner diameter surface of an inner ring of each of the rolling bearings 18. The rotation shaft 9 is rotatably supported by the bearing member 15 through the plurality of rolling bearings 18.

The carrier 19 is provided on the inner circumference of the linear motion portion 14 so as to be rotatable relative to the rotation shaft 9. The carrier 19 has disks that confront each other in the axial direction. The disk proximate to the bearing member 15 may be referred to as an inner disk, and the other disk may be referred to as an outer disk. The outer disk is provided with a distance adjustment member on a side surface facing to the inner disk such that the distance adjustment member projects in the axial direction from the outer circumferential edge portion of the side surface. For adjusting the distances between the plurality of planetary rollers 22, a plurality of distance adjustment members are arranged so as to be spaced equidistantly from each other in the circumferential direction. The two disks are integrated with each other with the distance adjustment members.

The inner disk is rotatably supported by the slide bearing 20 fitted between the inner disk and the rotation shaft 9. The outer disk has a shaft insertion hole formed at the center thereof and the slide bearing 21 is fitted into the shaft insertion hole. The outer disk is supported by the slide bearing 21 so as to be rotatable relative to the rotation shaft 9. The restraining sections 11 and 12 for receiving a thrust load and restraining the position of the rotation shaft 9 in the axial direction are provided on both end portions of the rotation shaft 9. Each of the restraining sections 11 and 12 includes, for example, a stopper composed of a washer or the like. Retaining rings for preventing the restraining sections 11 and 12 from being removed are provided on both end portions of the rotation shaft 9.

The carrier 19 has a plurality of roller shafts 23 spaced from each other in the circumferential direction. Opposite end portions of each roller shaft 23 are supported by the inner disk and the outer disk. That is, each of the two disks has a plurality of shaft insertion holes that are formed as oblong holes, and both end portions of each roller shaft 23 are inserted into the corresponding shaft insertion holes, whereby the roller shafts 23 are supported so as to be movable in the radial direction within the ranges of the length of the respective shaft insertion holes. Two elastic rings 24 are extended over the plurality of roller shafts 23 at both end portions thereof respectively so as to urge a set of the roller shafts 23 in the radially inward direction.

The planetary rollers 22 are rotatably supported by the corresponding roller shafts 23, and each planetary roller 22 is disposed between the outer circumferential surface of the rotation shaft 9 and the inner circumferential surface of the linear motion portion 14. Each planetary roller 22 is pressed against the outer circumferential surface of the rotation shaft 9 by the urging force of the elastic ring 24 extended over the plurality of roller shafts 23. By a rotation of the rotation shaft 9, each planetary roller 22 that is in contact with the outer circumferential surface of the rotation shaft 9 rotates due to a contact friction therebetween. On the outer circumferential surface of each planetary roller 22, a helical groove is formed so as to mesh with the helical projection of the linear motion portion 14.

The speed reduction mechanism 3 is a mechanism that reduces the speed of rotation of the electric motor 2 and transmits the rotation thereof to an output gear 25 fixed to the rotation shaft 9. The speed reduction mechanism 3 includes a plurality of gear trains (not shown). In this example, the speed reduction mechanism 3 sequentially reduces, by the above-described gear trains, the speed of rotation of an input gear (not shown) mounted to a rotor shaft (not shown) of the electric motor 2, and allows the rotation to be transmitted to the output gear 25. The locking mechanism is configured to be able to switch between: a locking state in which a braking force reducing operation of the linear motion mechanism 4 is inhibited; and an unlocking state in which the braking force reducing operation is permitted.

Figure 2:
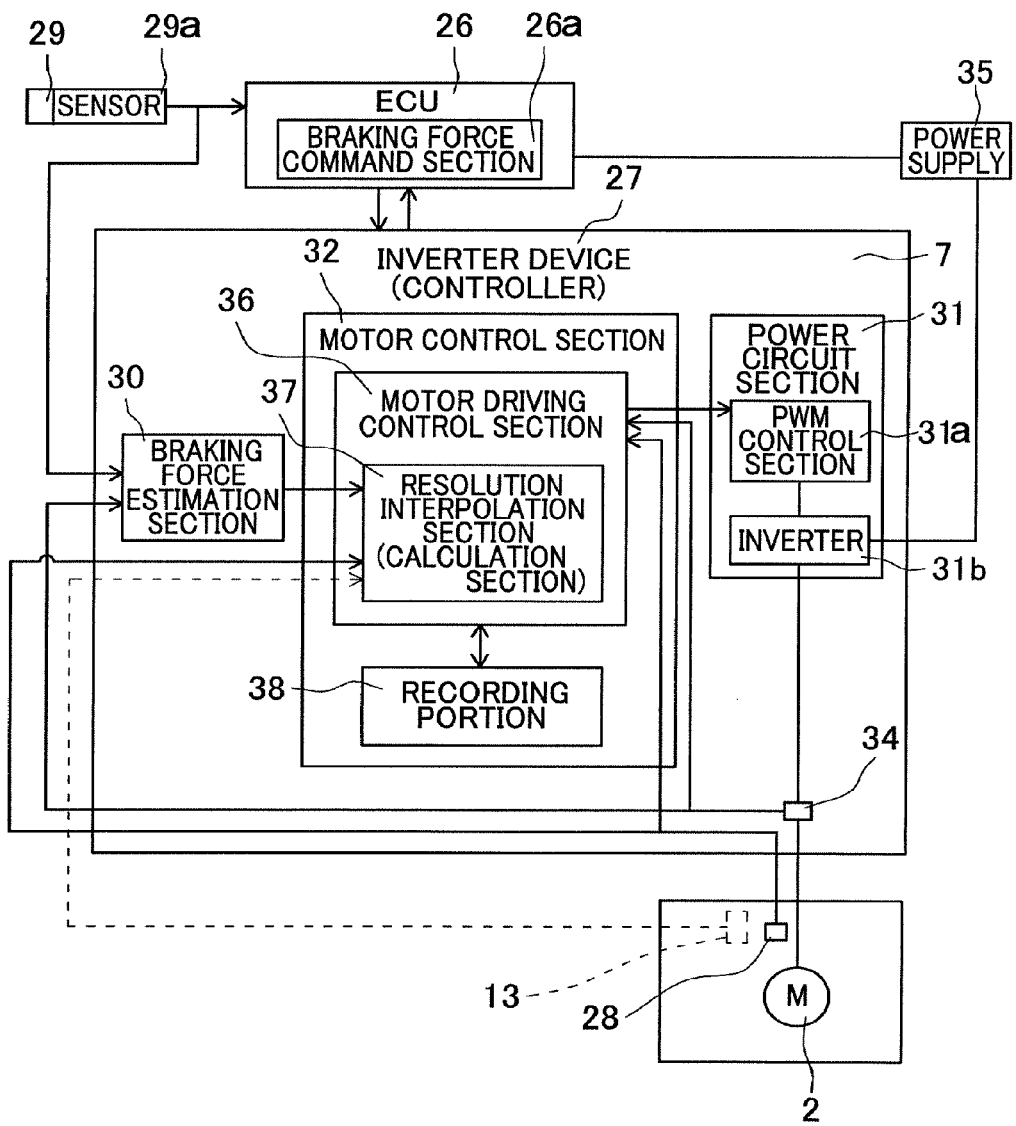
FIG. 2 is a block diagram of a control system of the electric brake device.

FIG. 2 is a block diagram of a control system of the electric brake device. The controller 7 of the electric brake device is an inverter device 27. As the ECU 26 serving as a higher-order control unit of the inverter device 27, an electric control unit that performs overall control of a vehicle is applied, for example. The ECU 26 is provided with a braking force command section 26a. In response to an output from a sensor 29a that varies according to the operation amount of a brake pedal serving as a brake operation portion 29, the braking force command section 26a generates and outputs a command value of a target braking force by using an LUT (Look Up Table) or a predetermined transform function or the like from a library. The brake operation portion 29 is not limited to a pedal input manner, and may be a button input manner, a lever input manner or the like so long as it is used by the operator to provide an instruction to apply a brake.

The inverter device 27 includes: a braking force estimation section 30 that obtains an estimated value of the braking force that presses the friction pad 6 (FIG. 1) against the brake rotor 5 (FIG. 1); a power circuit section 31 provided for each electric motor 2; a motor control section 32 that controls the corresponding power circuit section 31; and a current detector 34.

The braking force estimation section 30 determines, from an output from a sensor 29a that varies according to the operation amount of the brake operation portion 29 and from a motor current detected by the current detector 34, an appropriate estimated value of the braking force by calculation using an LUT or a predetermined transform function or the like from a library. The relationship between the output of the sensor 29a, the motor current, and the estimated value of the braking force is defined in advance based on results of an experiment, simulation, or the like and is recorded in a recording portion 38 in a rewritable manner.

In addition to this, the braking force estimation section 30 may use a value detected by a load sensor 13 that detects an axial load of the linear motion mechanism 4. In this case, when the driver of the vehicle depresses the brake operation portion 29 from a released state, the controller 7 causes the linear motion portion 14 (FIG. 1) to advance the friction pad 6 from a position separate from the brake rotor 5 (FIG. 1) to an outboard side (FIG. 1), whereby the friction pad 6 comes into contact with the brake rotor 5. By detecting the reaction force occurring during this contact by the load sensor 13, a minimum detection value that can be detected, i.e., a minimum braking force is obtained.

With an increase in the operation amount of depressing the brake operation portion 29, the braking force detected by the load sensor 13 gradually increases. By using the value detected by the load sensor 13, it is possible to more accurately detect the braking force than by obtaining an estimated value of the braking force from the output from the sensor 29a and the motor current.

The motor control section 32 is composed of a computer including a processor, and electronic circuits such as a ROM (Read Only Memory) including programs to be executed by the processor, a RAM (Random Access Memory), and a co-processor. According to a command value of the braking force provided by the braking force command section 26a and to an estimated value of the braking force estimated by the braking force estimation section 30, the motor control section 32 converts these values into a current command represented by a voltage value, and provides the current command to the power circuit section 31. The motor control section 32 has a function for outputting, to the ECU 26, various types of information such as detected values and control values with respect to the electric motor 2.

The power circuit section 31 includes: an inverter 31b that converts DC power from a power supply 35 into three-phase AC power that is to be used for driving the electric motor 2; and a PWM control section 31a that controls the inverter 31b. The electric motor 2 is composed of a three-phase synchronous motor or the like. The electric motor 2 is provided with a motor rotation angle detector 28 that detects a rotation angle of a rotor (not shown), such as a rotation angle sensor or a rotary encoder. The inverter 31b includes a plurality of semiconductor switching elements (not shown), and the PWM control section 31a performs pulse width modulation of the inputted current command and provides an on/off command to each of the semiconductor switching elements.

The motor control section 32 includes a motor driving control section 36 as a basic control section thereof. According to the above-described command value and estimated value of the braking force, the motor driving control section 36 converts these values into a current command represented by a voltage value, and provides a motor operation command value including the current command to the PWM control section 31a of the power circuit section 31. The motor driving control section 36 obtains, from the current detector 34, the motor current supplied from the inverter 31b to the electric motor 2 and performs a current feedback control for the command value of the braking force. The motor driving control section 36 obtains a rotation angle of the rotor (not shown) of the electric motor 2, i.e., a motor rotation angle from the motor rotation angle detector 28, and provides the current command to the PWM control section 31a such that an efficient motor driving corresponding to the motor rotation angle is enabled.

The motor driving control section 36 is provided with a resolution interpolation section 37. The resolution interpolation section 37 interpolates, by using the motor rotation angle detected by the motor rotation angle detector 28, a minimum resolution of the braking force obtained by the braking force estimation section 30. In this case, the motor rotation angle detector 28, which is used in at least a partial region of the braking force from the minimum braking force to the maximum braking force, has a higher resolution than a motor rotation angle that causes a braking force fluctuation equivalent to the minimum braking force resolution of the braking force estimation section 30.

The resolution interpolation section 37 determines a relationship between: a braking force estimation result at the point of time when the braking force obtained by the braking force estimation section 30 changes from a predetermined value by a prescribed value or higher; and the motor rotation angle detected by the motor rotation angle detector 28. Furthermore, the resolution interpolation section 37 interpolates and calculates, by using an LUT or a predetermined transform function or the like from a library, intermediate values between the braking force estimation result (estimated value) and each of next braking force estimation results (estimated values) obtained by adding prescribed positive value and negative value (e.g., a positive value when the brake pedal 29 is depressed and a negative value when the brake pedal 29 is released) to the braking force estimation result, respectively, based on the motor rotation angle detected by the motor rotation angle detector 28. As described above, the resolution interpolation section 37 interpolates the minimum resolution by using the motor rotation angle.

The calculation section 37 (FIG. 2) obtains an absolute angle of the motor rotation angle, for example, by determining which of a plurality of rotations (a plurality of times of the above-described transition) the motor rotation angle θ (relative angle) detected by the motor rotation angle detector 28 corresponds to, based on the braking force F obtained by the braking force estimation section 30. While the braking force transitions from zero to the maximum value, the motor rotation angle detected by the motor rotation angle detector 28 varies a plurality of times over a full scale from the angle "0" to the maximum angle (360°: relative angle). In addition, a piston position (i.e., the motor rotation angle) at which the friction pad and the brake rotor start coming into contact changes due to the wear of the friction pad or the like. Therefore, the absolute angle of the motor rotation angle for accurately exerting a desired braking force cannot be known only by the motor rotation angle detector 28. With the calculation section 37, the absolute angle of the motor rotation angle for exerting a desired braking force can be obtained, by using an LUT, an addition function from a library, an adder or the like, from a relationship between the motor rotation angle detected by the motor rotation angle detector 28 and the braking force obtained by the braking force estimation section 30. Accordingly, it is possible to achieve improved control accuracy without involving a cost increase.

The prescribed value is arbitrarily determined as required, for example, from results of an experiment, simulation, or the like, and is recorded in the recording portion 38 in a rewritable manner. The resolution interpolation section 37 increases the prescribed value with an increase in the difference between the command value of the braking force that is generated by the braking three command section 26a and the braking force estimation result, or with an increase in a rate of change of the difference between the braking force command value and the braking force estimation result.

Increasing the prescribed value reduces the resolution, but improves the anti-noise characteristics. When the difference between the braking force command value and the braking force estimation result or the rate of change of the difference is large, the effect of resolution interpolation is relatively small. Therefore, the resolution interpolation section executes a so-called thinning process for increasing the prescribed value according to the difference or the rate of change of the difference. This can reduce the computational load of the controller 7.

Figure 3:
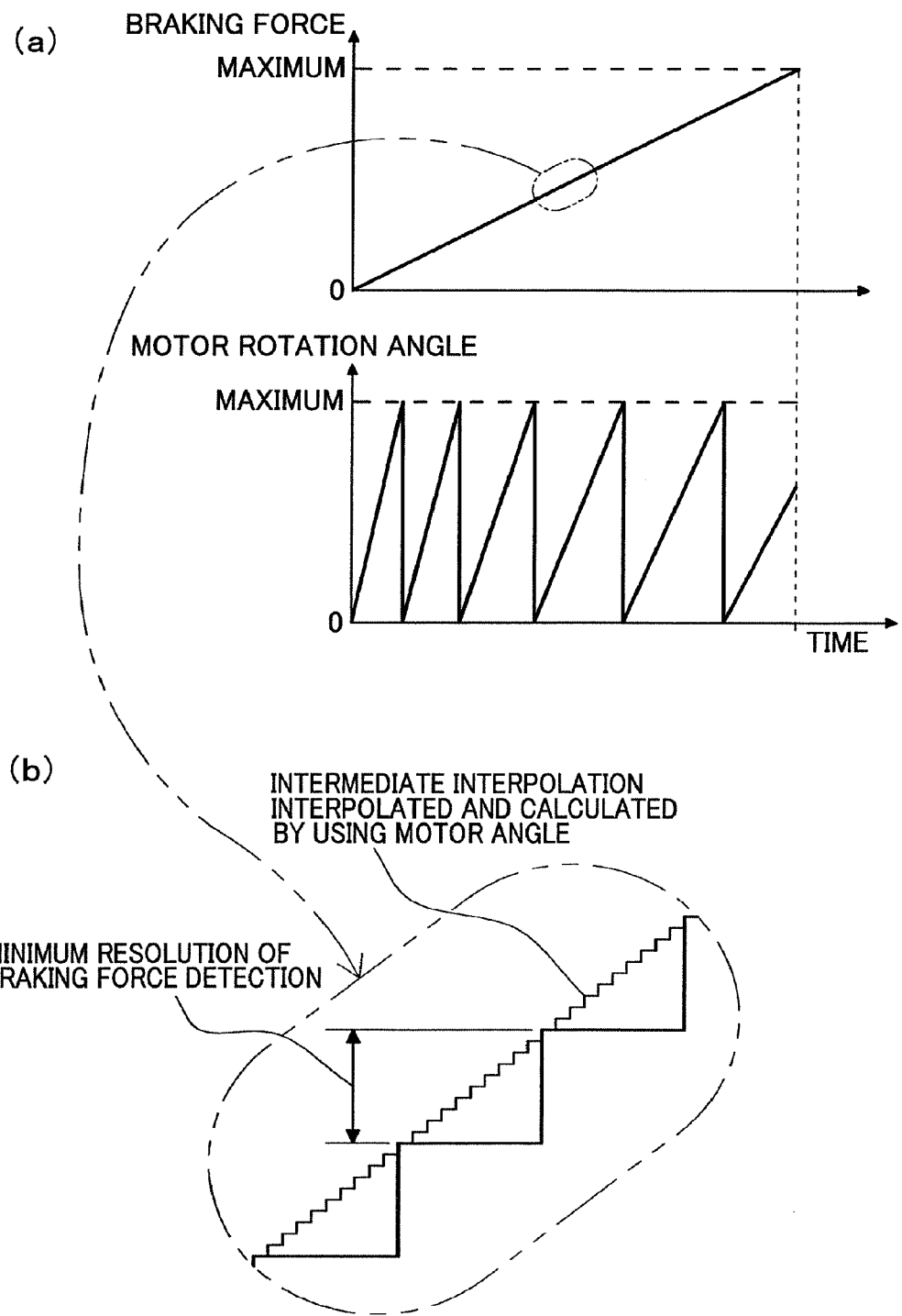
FIG. 3 is a conceptual diagram illustrating a braking operation in the electric brake device.

FIG. 3 is a conceptual diagram illustrating a braking operation in the electric brake device. Hereinafter, a description will be given also with reference to FIGS. 1 and 2 as necessary. As shown in chart (a) of FIG. 3, for example, the motor rotation angle that is detected while the braking force transitions from zero to the maximum value in the electric brake device is a relative angle, and transitions, a plurality of times, over a full scale from the angle "0" to the maximum angle (360°) in the motor rotation angle detector 28.

Chart (b) of FIG. 3 shows an example in which the braking force detection result is interpolated in a partial section encircled by the single dotted line in chart (a) of FIG. 3. How much the motor rotation angle detected by the motor rotation angle detector 28 transitions relative to the minimum resolution of the braking force, or in other words, how much the motor rotation angle transitions when the braking force changes by an amount corresponding to the minimum resolution can be estimated based on information that is provided in advance, such as the caliper rigidity and an equivalent lead. Based on a result of this estimation, the resolution interpolation section 37 of the controller 7 interpolates, by using the motor rotation angle detected by the motor rotation angle detector 28 in the above-described manner, the minimum resolution of the braking force obtained by the braking force estimation section 30. Then, for example, even when the detection resolution of the braking force is lower than the required resolution of the target braking force, control can be performed by interpolating and calculating an intermediate value with the motor rotation angle.

Figure 4:
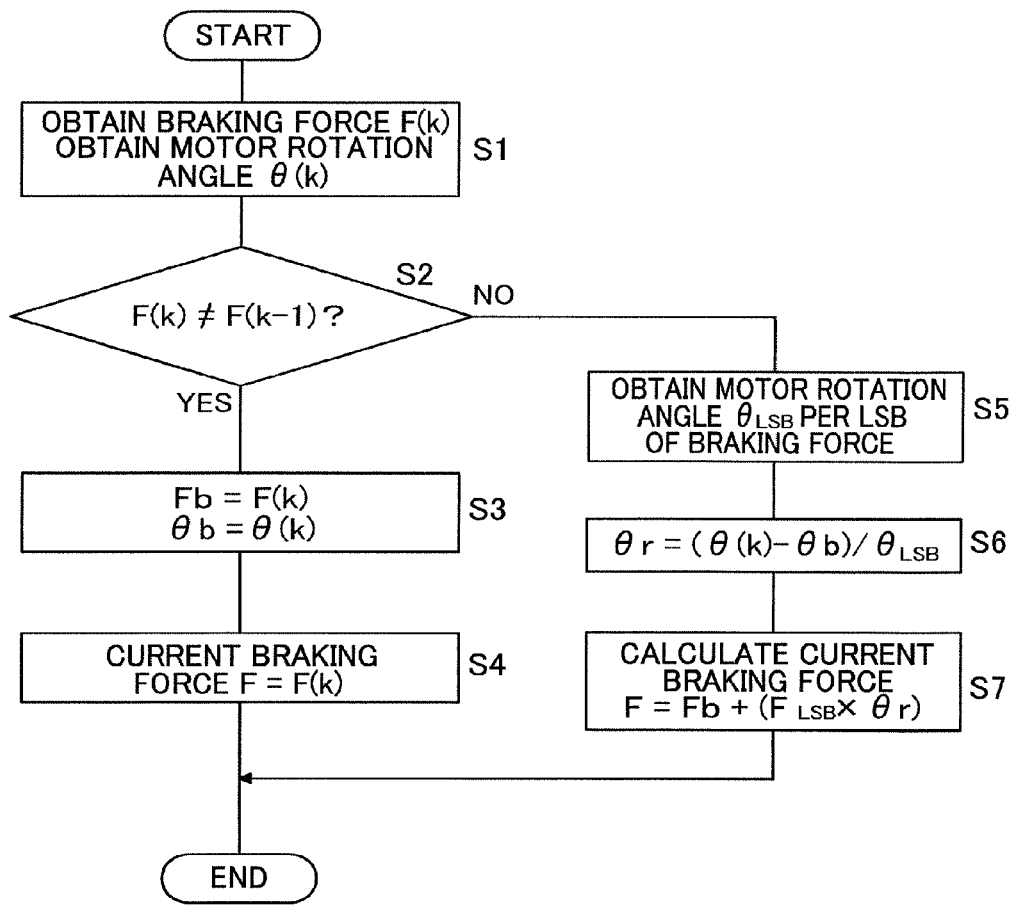
FIG. 4 is a flowchart showing an example in which a braking force estimated value is interpolated with a motor rotation angle in the electric brake device.

FIG. 4 is a flowchart showing an example in which the braking force estimated value is interpolated by using the motor rotation angle in the electric brake device. For example, the present process is started under the condition of activating a main power supply of a vehicle having the electric brake device mounted therein, and the resolution interpolation section 37, which is also referred to as the "calculation section" (FIG. 2), obtains, from the braking force estimation section 30, a braking force F(k) after the brake pedal 29 is depressed, and obtains a motor rotation angle θ(k) corresponding to the braking force F(k) from the motor rotation angle detector 28 (step S1). The obtained braking force F(k) and motor rotation angle θ(k) are temporarily recorded in the recording portion 38.

Next, the resolution interpolation section 37 determines whether or not the obtained braking force F(k) has changed relative to a most recent past braking force F(k−1) recorded in the recording portion 38 (step S2). If it is determined that the braking force F(k) has changed (step S2: yes), the resolution interpolation section 37 stores the braking force F(k) as a reference braking force Fb, and stores the motor rotation angle θ(k) corresponding to the braking force F(k) as a reference rotation angle θb (step S3). Thereafter, the resolution interpolation section 37 stores the braking force F(k) as a current braking force F (step S4), and the present process is ended. The reference braking force Fb and the reference rotation angle θb are recorded in the recording portion 38.

If it is determined at step S2 that the braking force F(k) has not changed relative to the most recent braking force F(k−1) (step S2: no), the resolution interpolation section 37 calculates a motor rotation angle $θ_{LSB}$ per LSB of the braking force that corresponds to a difference of step between each of $2^N$ steps when represented as an N-bit (N is a natural number) digital value (step S5). Specifically, $θ_{LSB}=θ_M/2^N$ is satisfied, with respect to a maximum value $θ_M$ (absolute angle) of the motor rotation angle θ that corresponds to a value ($2^N-1$) when all N bits are 1. Next, the resolution interpolation section 37 calculates a rate of change θr of the motor rotation angle per LSB of the braking force (step S6). The rate of change θr is obtained by dividing, by the motor rotation angle $θ_{LSB}$, a value obtained by subtracting the reference rotation angle θb from the motor rotation angle θ(k). Next, the resolution interpolation section 37 calculates the current braking force F by the following formula: F=Fb+($F_{LSB}$×θr) (step S7). $F_{LSB}$, when represented as an N-bit (N is a natural number) digital value, satisfies $F_{LSB}=F_M/2^N$, with respect to a maximum value of the braking force F that corresponds to the value ($2^N-1$) when all N bits are 1. Thereafter, the present process is ended. LSB, which is an abbreviation of a Least Significant Bit, is the bit position representing the least or smallest value in a binary number in a computer.

Meanwhile, the electric brake device shown in FIG. 1 is mounted, for example, inside each wheel of the vehicle having the electric brake device mounted therein, and therefore, the volume of the electric brake device is preferably as small as possible. The pressing force of the friction pad 6 relative to the motor torque of the electric brake device (i.e., the braking force) is determined by a speed reduction ratio provided by the speed reduction mechanism 3 and performance represented by a total linear motion distance relative to the rotational input of the linear motion mechanism 4 (i.e., an equivalent lead relative to the motor rotation). In general, the motor torque is dependent on the motor volume. That is, the equivalent lead needs to be sufficiently small in order to decrease the volume of the electric brake device.

On the other hand, when the friction pad 6 is pressed against the brake rotor 5, the surrounding members are deformed by this pressing force. It is necessary to cause the linear motion mechanism 4 to project according to the amount of this deformation. For example, in the case of a disk brake, in general, the deformation amount of the friction pad 6 and the housing 1 (i.e., the caliper) at the time of exerting the maximum braking force is often about 0.5 mm to 1 mm. In the electric brake device according to the present embodiment, the equivalent lead per motor rotation is set to be about 0.05 mm to 0.2 mm, for example. With this setting, it is possible to achieve an electric brake device having a motor size that allows the electric brake device to be mounted in a mounting space substantially similar to that for an existing hydraulic brake.

With the electric brake device described above, the motor rotation angle detector, which is used in the above-described partial region of the braking force, has a higher resolution than a motor rotation angle that causes a braking force fluctuation equivalent to the minimum braking force resolution of the braking force estimation section. As the motor rotation angle detector, sensors that are inexpensive and have high resolution, including, for example, a resolver and a GMR sensor, are widely put into practical use, so that the motor rotation angle detector can be readily mounted in the electric brake device. Since an existing detector originally provided in the electric motor can be applied as the motor rotation angle detector, it is not necessary to secure a mounting space for the motor rotation angle detector, and to newly add a dedicated sensor to the electric brake device, thus making it possible to achieve a cost reduction.

While the braking force transitions from zero to the maximum value, the detected motor rotation angle transitions, a plurality of times, over a full scale from an angle "0" to the maximum angle (360°: relative angle) in the motor rotation angle detector 28, for example. How much the motor rotation angle detected by the motor rotation angle detector transitions relative to the minimum resolution of the braking force can be estimated based on information that is provided in advance, such as the caliper rigidity and the equivalent lead. Based on a result of this estimation, the resolution interpolation section of the controller interpolates, by using the motor rotation angle detected by the motor rotation angle detector, a minimum resolution of the braking force obtained by the braking force estimation section. Then, for example, even when the detection resolution of the braking force is lower than the required resolution of the target braking force, the control can be performed by interpolating and calculating an intermediate value with the motor rotation angle. In this manner, it is possible to achieve improved control accuracy without involving a cost increase.

In the present embodiment, a disk brake-type electric brake device is employed as an example. However, the electric brake device of the present invention is not limited to a disk brake type, and may also be applied with a drum brake type. Although the linear motion mechanism is described using a planetary roller type, another type, such as a ball screw type or a ball lamp type, may be used as the linear motion mechanism.

As an embodiment that does not presuppose the inclusion of the resolution interpolation section, the present invention includes the following aspect.

[Aspect]

An electric brake device including: an electric motor; a brake rotor; a friction pad configured to come into contact with the brake rotor to generate a braking force; a transmission mechanism configured to convert a rotary motion of the electric motor into a motion with which the friction pad generates the braking force; a braking force command section configured to generate a command value of a target braking force by using an operation amount of a brake operation portion; a braking force estimation section configured to obtain an estimated value of a braking force that presses the friction pad against the brake rotor; a motor rotation angle detector configured to detect a rotation angle of the electric motor; and a controller configured to control the electric motor according to the command value and the estimated value of the braking force, wherein the motor rotation angle detector has a higher resolution than a motor rotation angle that causes a braking force fluctuation equivalent to a minimum braking force resolution of the braking force estimation section, and the controller includes a calculation section configured to obtain an absolute angle of the motor rotation angle by determining which of a plurality of rotations the motor rotation angle detected by the motor rotation angle detector corresponds to, based on the braking force obtained by the braking force estimation section.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

Reference Numerals

2 . . . electric motor
4 . . . linear motion mechanism (transmission mechanism)
5 . . . brake rotor
6 . . . friction pad
7 . . . controller
13 . . . load sensor
26a . . . braking force command section
28 . . . motor rotation angle detector
29 . . . brake operation portion
30 . . . braking force estimation section
37 . . . resolution interpolation section

What is claimed is:

1. An electric brake device comprising:
an electric motor;
a brake rotor;
a friction pad configured to come into contact with the brake rotor to generate a braking force;
a transmission mechanism configured to convert a rotary motion of the electric motor into a motion of the friction pad;
a braking force command section configured to generate a command value of a target braking force by using an operation amount of a brake operation portion;
a braking force estimation section configured to obtain an estimated value of a braking force that presses the friction pad against the brake rotor;
a motor rotation angle detector configured to detect a rotation angle of the electric motor; and
a controller configured to control the electric motor according to the command value and the estimated value of the braking force, wherein the motor rotation angle detector has a higher resolution than a motor rotation angle that causes a braking force fluctuation equivalent to a minimum braking force resolution of the braking force estimation section, and wherein the controller includes a resolution interpolation section configured to interpolate, by using the motor rotation angle detected by the motor rotation angle detector, the minimum resolution of the braking force obtained by the braking force estimation section.

2. The electric brake device as claimed in claim 1, wherein the braking force estimation section uses a value detected by a load sensor configured to detect an axial load of the transmission mechanism.

3. The electric brake device as claimed in claim 1, wherein the resolution interpolation section:

determines a relationship between a braking force estimation result at a point of time when the braking force obtained by the braking force estimation section changes by a prescribed value or higher and the motor rotation angle detected by the motor rotation angle detector; and interpolates and calculates intermediate values between the braking force estimation result and each of next braking force estimation results obtained by adding prescribed positive addition value and negative addition value to the braking force estimation result, respectively, based on the motor rotation angle detected by the motor rotation angle detector.

4. The electric brake device as claimed in claim 3, wherein the resolution interpolation section increases the prescribed value with an increase in a difference between the braking force estimation result and the command value of the braking force that is generated by the braking force command section.

5. The electric brake device as claimed in claim 3, wherein the resolution interpolation section increases the prescribed value with an increase in a rate of change of a difference between the braking force estimation result and the command value of the braking force that is generated by the braking force command section.

6. The electric brake device as claimed in claim 1, wherein the controller includes a calculation section configured to obtain an absolute angle of the motor rotation angle by determining which of a plurality of rotations the motor rotation angle detected by the motor rotation angle detector corresponds to, based on the braking force obtained by the braking force estimation section.

* * * * *